United States Patent [19]

Marchant et al.

[11] Patent Number: 4,475,183

[45] Date of Patent: Oct. 2, 1984

[54] OPTICAL DISK RETRIEVAL METHODS, MEDIA AND SYSTEMS EMPLOYING DIGITAL DATA OF HIGH FRACTIONAL BANDWIDTH

[75] Inventors: Alan B. Marchant, Rochester; Dennis G. Howe, Pittsford, both of N.Y.

[73] Assignee: Eastman Kodak Company, Rochester, N.Y.

[21] Appl. No.: 315,109

[22] Filed: Oct. 26, 1981

[51] Int. Cl.³ .............................................. G11B 7/00
[52] U.S. Cl. ..................................... 369/59; 360/42; 369/109; 369/275
[58] Field of Search ...................... 369/59, 109-111, 369/275; 365/124, 127; 358/342; 360/32, 40, 43, 42

[56] References Cited

U.S. PATENT DOCUMENTS

| | | | |
|---|---|---|---|
| 3,810,232 | 5/1974 | Aghazadeh | 340/174.1 H |
| 4,065,786 | 12/1977 | Stewart | 358/128 |
| 4,238,843 | 12/1980 | Carasso et al. | 358/342 X |
| 4,375,088 | 2/1983 | de Haan et al. | 369/44 X |

OTHER PUBLICATIONS

"Optical Readout of RCA VideoDisc, *RCA Review*, vol. 39, Sep. 1978, pp. 392-410.

*Primary Examiner*—Raymond F. Cardillo, Jr.
*Attorney, Agent, or Firm*—Warren E. Kurz

[57] ABSTRACT

High information density retrieval method and system which employ the scanning of an optical disk, having a thermally-deformable record layer overlying a reflective support, with a read light beam. The optical disk tracks contain information in the form of variable-width, approximately $0.5\pi$ phase-depth, pit regions interleaved between nominal thickness land regions. The pits have varying track lengths within a pit-length range constituting a disk fractional band-width of greater than 4.0 and read light reflected from the tracks is split-detected. The split-detected, electrical analog signal is peak-detected to reconstruct recorded digital data on the disk.

6 Claims, 8 Drawing Figures

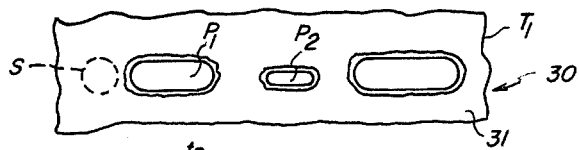
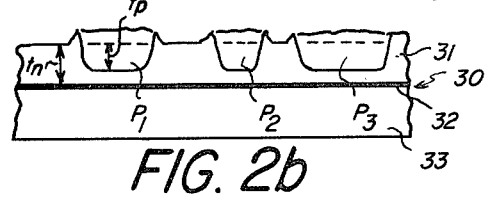
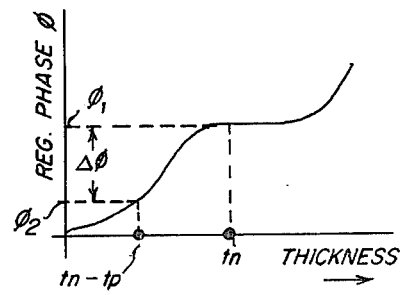
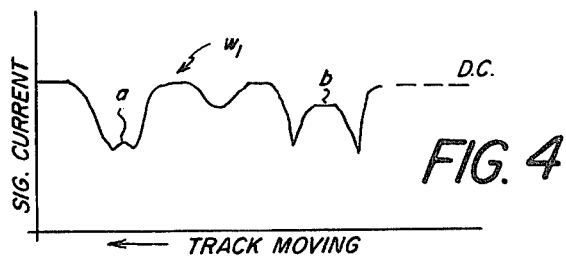
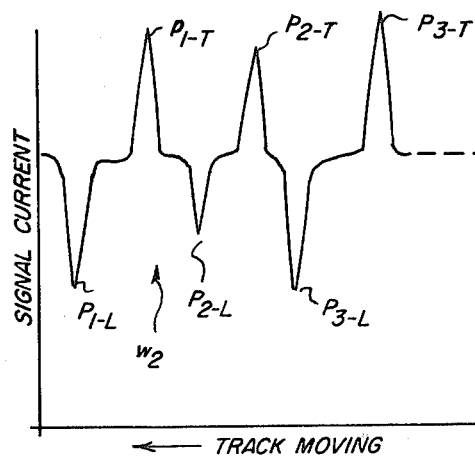

FIG. 6
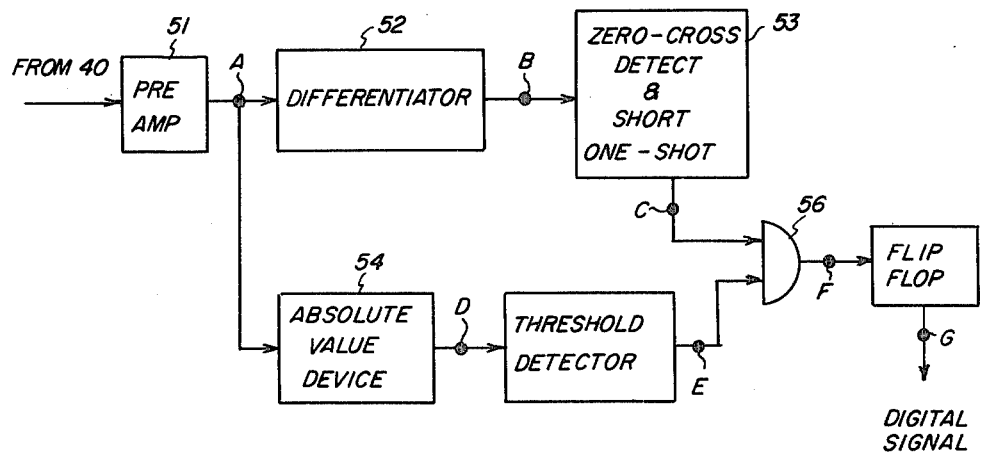
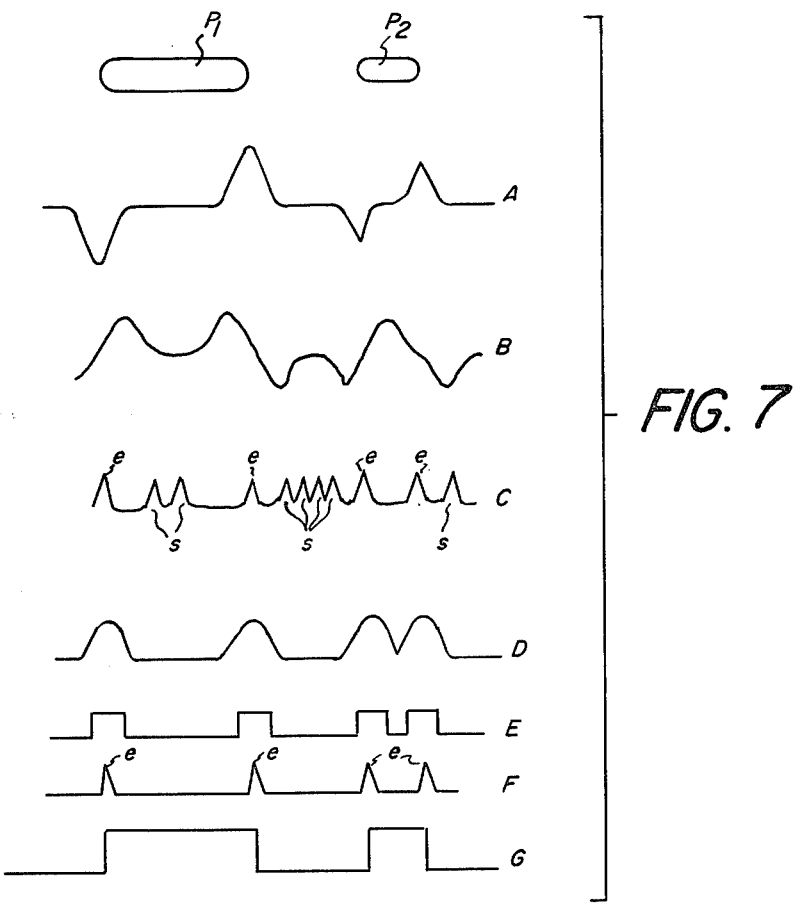
FIG. 7

OPTICAL DISK RETRIEVAL METHODS, MEDIA AND SYSTEMS EMPLOYING DIGITAL DATA OF HIGH FRACTIONAL BANDWIDTH

BACKGROUND OF THE INVENTION

1. Field of the Invention

The present invention relates to storage and retrieval of high density information and more particularly to optical disk methods, media and systems characterized by predetermined record structure (comprising high-fractional-bandwidth, varying-length pit regions) and predetermined detection techniques.

2. Description of the Prior Art

Optical disk technology for writing and reading with high information densities has been in active development in recent years. One general application of this technology is in recording and playing back FM encoded video (e.g. television) signals. Most optical disk approaches involve minute marks and spaces formed along spiral or concentric information tracks. The tracks are scanned by a reading light beam and the read light, as modulated by the marks and spaces, passes to a photodetector which outputs a generally-corresponding, modulated electrical signal.

The range of frequencies used to FM encode a video signal usually does not result in optical disks having "fractional bandwidths" greater than about 4.0 (The term "fractional bandwidth" of an optical disk is defined herein to be the ratio of the maximum mark length on the disk, in-track, to the minimum mark length on the disk.) Readout techniques for such FM encoded information usually detect the in-track mark-to-mark spacings to derive a sinusoidal FM electrical signal (in contrast to detecting the precise location of the leading and trailing edge of each successive mark). The detected FM video signal is then demodulated (essentially by averaging the spacings between two or more contiguous pairs of FM signal crossings) to produce, e.g., an analog baseband television signal.

The optical disk technology also holds strong potential for massive digital data storage, e.g. as a memory media for digital computers. However, the prior art optical disk systems and methods for storing and retrieving television type video information are not optimal for the mass digital data storage applications. In the latter applications it is important to maximize the information bit densities of the disks and to minimize the instances of reading a wrong digital bit of information from a recorded disk (i.e., minimize the bit error rate). It has been found that the more efficient techniques for encoding digital data (e.g. long run length transition modulation codes) presuppose optical disk fractional bandwidths in excess of 4.0 (for constant angular velocity recording). Also in such applications it is advantageous, from the viewpoints of maximizing packing density and minimizing bit error rate, to detect the precise location of leading and trailing pit edges.

SUMMARY OF THE INVENTION

A significant purpose of the present invention is to provide new optical disk methods, media and systems particularly adapted for mass digital data storage and retrieval applications of the kind involving high-fractional bandwidths, and wherein precise sensing of leading and trailing edge mark position is important.

Another purpose of the present invention is to provide real-time optical disk methhods media and systems which have significant advantages for the storage and retrieval of digitally encoded information.

In general, the above and other advantages of the present invention are obtained by scanning a read light beam of predetermined wavelength with respect to information tracks of an optical disk of the kind that includes a thermally-deformable, read-light-transparent record layer of predetermined nominal thickness and a contiguous reflective layer. The information tracks of the record layer comprise land regions of said nominal thickness interleaved between pit regions that are: (1) of different in-track lengths forming a pit length range constituting a disk fractional bandwidth greater than 4.0, (2) of varying cross-track width and (3) of depth yielding a generally uniform, predetermined phase difference, between read light reflected respectively from said land and pit regions within a range from about $0.25\pi$ to about $0.75\pi$. The read light reflected from the tracks is split detected to produce an electrical analog signal, and the peaks of such analog signal are detected to precisely identify the leading and trailing edge locations of the pits. Other aspects of the present invention provide record media of the type described above and a playback system including such media in combination with such split-detecting and peak-sensing means.

In a further aspect, the present invention involves reconstructing digital information signals indicative of the disk-stored information from the peak sensing of such split-detected, analog signal.

Other objects and advantages of the present invention will be recognized in view of the detailed description of preferred embodiments set forth below.

BRIEF DESCRIPTION OF THE DRAWINGS

The subsequent description of preferred embodiments of the invention refers to the attached drawings wherein:

FIGS. 2-A and 2-B are respectively top and side sectional views of a portion of an optical disk record medium in accord with the present invention;

FIG. 3 is a diagram illustrating optical characteristics of such optical disk record medium;

FIG. 4 is a signal waveform illustrating prior art central aperture detection when applied to such record medium;

FIG. 5 is a signal waveform illustrating split-detection with such record medium;

FIG. 6 is an exemplary circuit for a peak-detecting digital decoder in accordance with the present invention; and FIG. 7 is a diagram illustrating waveforms at various stages of the FIG. 6 circuit.

DETAILED DESCRIPTION OF THE PREFERRED EMBODIMENTS

Figure 1:
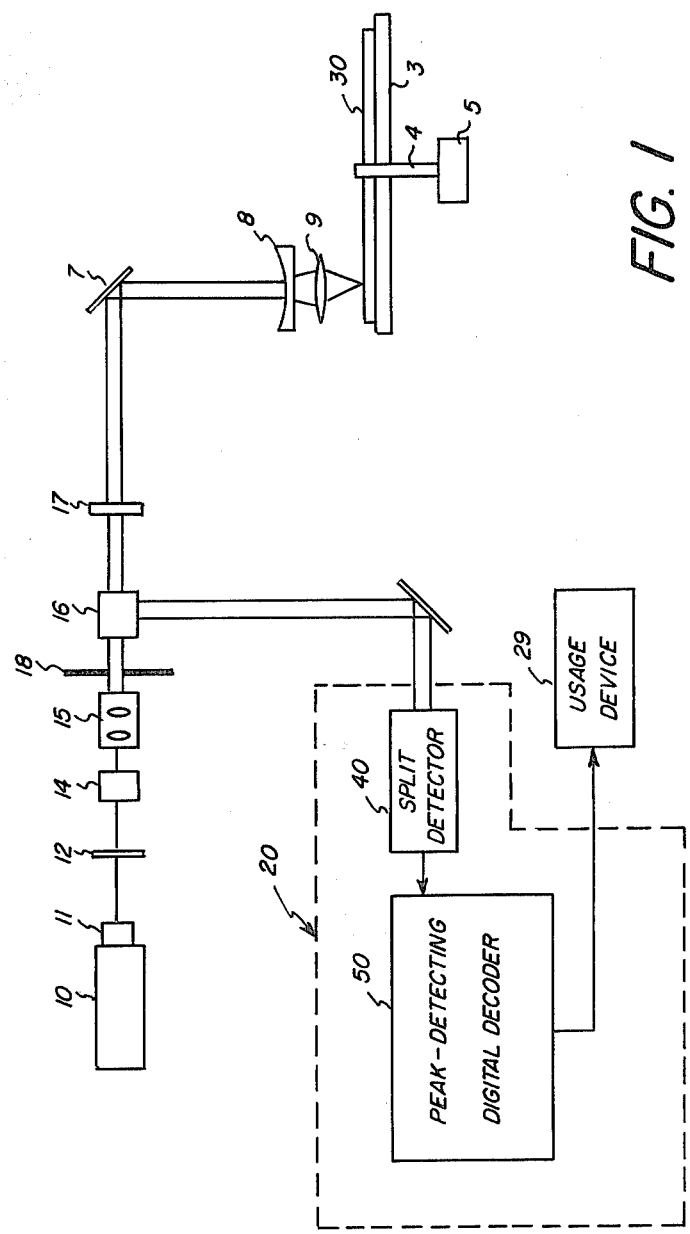
FIG. 1 is a schematic illustration of one embodiment for practice of the present invention.

As noted above the approach of the present invention involves the combination of particular optical disk record media with particular retrieval techniques to yield significant advantages for massive digital data storage and retrieval applications. In general, the preferred record medium is a particular variety of the unique optical disk embodiments disclosed in U.S. patent application Ser. No. 124,381 entitled "Physically Optimized Optical Disc Structure, Method and Apparatus," filed Feb. 25, 1980 in the names of Howe and Wrobel. The preferred readout technique employs peak sensing of a "split detection" output signal. More detailed description of these important features of the present invention is presented below; however, first, it will be helpful to consider a general description of an exemplary optical disk storage and retrieval system of the type in which the present invention is useful.

One such storage and retrieval system is illustrated schematically in FIG. 1 and includes a read laser 10 which provides a beam of coherent light of a predetermined wavelength. In its path to the record medium the laser light beam passes in succession through polarizing rotator 11, polarizer 12, tracking modulator 14, afocal telescope 15, adjustable diaphragm 18, polarizing beamsplitter 16 and one-quarter wave plate 17. It is then reflected by mirror 7 through negative correction lens 8 to focusing objective 9. As shown, objective 9 forms a read light spot on the optical disk 30 which is supported on turntable 3 for rotation on central shaft 4, e.g. by a motor 5 coupled to the central shaft. As the disk rotates, the focussed read spot scans an information track on the disk. The disk's information tracks can be spiral or concentric and means (not shown) is provided for indexing the read-spot radially with respect to the rotating disk so that successive tracks are scanned during successive disk rotations.

As will be described in more detail below, the information tracks on the disk reflect the read light and phase modulate it in accordance with the record information on the disk. This reflected read light is directed by objective 9 and lens 8 back to beamsplitter 16. Because of its interactions with quarter-wave plate 17, the disk-reflected read light is directed by beamsplitter 16, via mirror 19, to electro-optic detection device denoted 20. It is the purpose of the present invention to enable storage and retrieval systems such as shown in FIG. 1, to provide an electrical signal (i.e. a data stream) to a usage device 29 which is as precise a reproduction as possible of the information signal data used to record information on the optical disk 30. To achieve this objective it is highly important, in accordance with the present invention, that both the proper record medium and the proper detection be utilized. These features of the present invention will now be described in more detail.

In accordance with the present invention the optical disk record medium has a thermally-deformable layer overlying and contiguous a reflective layer. The record layer preferably is highly transparent to light of the read wavelength and information is recorded along tracks of the record layer in the form of pits having different in-track lengths forming a pit length range that constitutes a fractional-bandwidth greater than 4.0. Additionally, the pits should have substantially uniform phase depth, with respect to the read light wavelength, that is in the range from about $0.25\pi$ to $0.75\pi$, preferably about $0.5\pi$. Also, it is highly preferred that the record layer have a nominal unrecorded thickness which renders pit rims and other debris on the disk surface substantially invisible to the detection system.

Referring now to FIGS. 2A and 2-B, a portion of one embodiment of such an optical disk record medium is illustrated. The optical disk 30 comprises a heat-deformable record layer 31 overlying, and in conductive heat transfer relation with, a reflective surface 32 on a support 33. The record layer 31 can be formed of a dye binder composition which is absorptive to write light of a wavelength different from the read light. It is important that the record layer be highly transparent to the read light wavelength. The reflective layer can be a metal, e.g. evaporated aluminum. The support can be glass, plastic film or other suitable support material.

Formed along an illustrated track $T_1$ of the disk 30 are many minute information pits P (here only three, $P_1$, $P_2$ and $P_3$ are shown). It will be noted that the pits have a substantially uniform depth $t_p$ but that they vary somewhat more in width (cross-track dimension), see FIG. 2-A depending on their length (in track dimension). Such width variation is characteristic of high-fractional-bandwidth records formed in real-time, heat-deformable, phase shift record layers. Typical pit lengths vary in the range from about 0.7 microns to about 10.0 microns. The record layer thickness typically is in the range from about 0.1 micron to about 0.45 micron but must be sufficiently thick relative to the read wavelength to provide the phase shift outlined above.

FIG. 3 indicates a reflected-read-light-phase versus layer-thickness-variation curve for an exemplary recording layer material of disk 30. From such a curve it can be noted that light reflected from an unrecorded land region of the disk 30 (having nominal recording layer thickness $t_n$) experiences a phase shift $\phi_1$ relative to a reference phase plane at the disk surface and the light reflected from a pit region of the disk (having a recording layer thickness $t_n$ minus the pit depth $t_p$) experiences a phase shift $\phi_2$. In accordance with the present invention the difference between $\phi_1$ and $\phi_2$ (the phase depth of the information pits) should be in the range from about $0.25\pi$ to about $0.75\pi$, preferably about $0.5\pi$.

It is also preferred according to the present invention that the nominal thickness $t_n$ of the record layer 31 be such that debris and pit rims are phase invisible, i.e. that substantial thickness increases above $t_n$ provide relatively very small phase shift from phase $\phi_1$ in comparison to phase shift caused by layer thickness decreases. The details of construction of recording layers to optimize this phase invisibility are set forth in the above cited application Ser. No. 124,381, which is incorporated herein by reference. For optimum results in accord with the present invention it is preferred that the thickness $t_n$ be thinner than the quantity $\lambda$ (read light wavelength)$\div N$ (the refractive index of the record layer).

We have found that with high-fractional-bandwidth information records of the above-described form, highly advantageous readout can be effected by: (1) scanning the record tracks with a read spot S of the predetermined read wavelength, (2) "split detecting" the reflected read light and (3) peak sensing the "split-detected" signal. To aid in understanding the advantages of this detection technique in recovering high-fractional-bandwidth (e.g. such as digital) record information, reference is now made to FIGS. 4 and 5. FIG. 4 shows a waveform that is representative of the output signal current from a "central aperture detector" in response to receipt of read light reflected from scan spot S as track $T_1$ moves thereunder from left to right. Central aperture detection is not preferred in accordance with the present invention and FIG. 4 is presented solely to illustrate some of the problems overcome by the present invention. The sensitivity of the commonly used central aperture detection technique to track variation is apparent from the waveform $W_1$ in FIG. 4. Thus with longer (and therefore wider) pits $P_1$ and $P_3$, the spot S is predominately within the pit yielding intra pit signal rises "a" and "b" toward the D.C. level. Such intra pit signal rises render accurate threshold detection of pit edge locations quite difficult. Note also that the low signal for pit P₂ might be missed entirely by threshold detection.

In accordance with the present invention, FIG. 5 shows a waveform $W_2$ generated by a "split detector" in response to $\pi/2$ phase deep pits $P_1$, $P_2$ and $P_3$ of track $T_1$ passing under read light spot S. We have found that such a "split detector" signal contains information enabling precise, high fidelity location of the leading and trailing edges of each of the pits, even though the pit width varies substantially. Thus peak $P_{1-L}$ identifies the lead edge of pit $P_1$, $P_{1-T}$ the trailing edge of pit $P_1$, etc. The signal from such split detector also has been found to exhibit good signal strength and to by symmetrical relative to the D.C. level with good equalization (i.e. non-radical variation of amplitude relative to in-track spatial frequency shift).

As used above and hereinafter in the specification and claims, the terms "split detector" (or "split detector means") and "split detecting" refer respectively to the structure for, and step of, detecting phase pits by differencing: (1) the signal from a first photosensor that is positioned at the overlap of the "0" order pit diffracted read beam and one first order pit diffracted read beam and (2) the signal from a second photosensor that is positioned at the overlap of such "0" order beam and the other first order pit diffracted read beam. A description of exemplary embodiments of split detectors and of their principles of operation is set forth e.g., in U.S. Pat. No. 4,065,786 and in the technical publication "Optical Readout of the RCA VideoDisc", pp. 392–410, *RCA Review*, Vol. 39, September 1978.

Referring now to FIG. 1 as well as FIGS. 2-A, 2-B and 5, the advantages of the method, media and system of the present invention can be more fully appreciated. Thus, as the track $T_1$ on disk 30 is rotated beneath the read spot focused by lens 9, the read light, phase-modulated successively by pits $P_1$, $P_2$ and $P_3$ is directed to split detector 40 via beamsplitter 16. The output from split detector 40 is a waveform like that shown in FIG. 5, which in accord with the present invention, is input to peak-detecting digital decoder means 50.

One preferred circuit for such a device 50 is shown in FIG. 6. It is to be noted that the sub-circuit components of the circuit 50 are of kinds well known in the art for performing the intended sub-functions identified on the drawings and explained further below. Thus the peak-detecting branch of circuit 50 comprises a pre-amplifier 51, a differentiator circuit 52 and a zero-cross detection circuit (which triggers a short one-shot multivibrator circuit) together identified as 53. The wave forms output by sub-circuits 51, 52 and 53 are shown respectively as curves A, B and C in FIG. 7.

Referring particularly to curve C, it will be noted that the shoulders of the signal from differentiator circuit 52 can create spurious signals "s" to be triggered by circuit 53, in addition to the true zero crossing signals "e" indicative of the edges of pits $P_1$ and $P_2$. To eliminate these spurious signals "s", it is advantageous to provide for circuit 50 a second branch which provides windows at proper periods relative to the true zero crossing signals "e". For this purpose absolute value device 54 circuit also receives the output from preamplifier 51 and provides a signal (curve D) to threshold detector 55. The output from threshold detector (curve E) is coupled with the output from circuit 53 (curve C) to inputs of AND gate 56. The AND gate thus produces a signal (curve F) having only true pit edge spikes "e" which are input to flip-flop 57 to generate digital signal, curve G.

The combination of optical disk medium and detection technique described above yield precise pit edge detection for high-fractional-bandwidth records. This storage and retrieval system exhibits decreased sensitivity to track width variation and read spot tracking inaccuracy. Additionally, there is decreased signal peak shifting as a function of spatial frequency of recorded information.

In accordance with the present invention the playback spot can be as small as desired, both in the in-track and cross-track directions. It is preferred that the numerical aperture of the read lens satisfy the condition $NA > \lambda r/2l(0.9)$ where $\lambda r$ is the read light wavelength and $l$ is the minimum pit or land length.

The invention has been described in detail with particular reference to certain preferred embodiments thereof, but it will be understood that variations and modifications can be effected within the spirit and scope of the invention.

What is claimed is:

1. A method of storing and retrieving high density digital data, said method comprising:
    (a) scanning a read light beam of predetermined wavelength with respect to digital data tracks of an optical disk that includes a thermally-deformable, read-light-transparent record layer of predetermined nominal thickness and a contiguous reflective layer, said digital data tracks comprising land regions of said nominal thickness interleaved between pit regions of: (1) different in-track lengths forming a pit length range constituting a disk fractional bandwidth greater than 4.0, (2) varying cross-track width and (3) depth yielding a generally uniform, predetermined phase difference, between read light reflected respectively from said land and pit regions, within the range of from about $0.25\pi$ to about $0.75\pi$;
    (b) split-detecting the read light reflected from said digital data tracks to produce an electrical analog signal; and
    (c) peak sensing such electrical signal to precisely identify the leading and trailing edge locations of such pits.

2. A method of storing and retrieving high density digital data, said method comprising:
    (a) scanning a read light beam of predetermined wavelength with respect to digital data tracks of an optical disk that includes a thermally-deformable, read-light-transparent record layer of predetermined nominal thickness and a contiguous reflective layer, said digital data tracks comprising land regions of said nominal thickness interleaved between pit regions of: (1) different in-track lengths forming a pit length range constituting a disk fractional bandwidth greater than 4.0, (2) varying cross-track width and (3) depth yielding a generally uniform phase difference, between read light reflected respectively from said land and pit regions, of about $0.5\pi$;
    (b) split-detecting the read light reflected from said digital data tracks to produce an electrical analog signal with peaks indicative of leading and trailing pit edges;

(c) peak sensing such electrical signal to precisely identify the leading and trailing edge locations of such pits; and (d) constructing an encoded digital signal corresponding to said pit edge locations.

3. A system for storing and retrieving high density digital data, said system comprising:

(a) means for producing a read light beam of predetermined wavelength;

(b) an optical disk of the kind having a thermally-deformable, read-light-transparent record layer of predetermined nominal thickness and a contiguous reflective layer, said record layer including digital data tracks comprising land regions of said nominal thickness interleaved between pit regions of: (1) different in-track lengths forming a pit length range constituting a disk fractional bandwidth greater than 4.0, (2) varying cross-track width and (3) depth yielding a generally uniform, predetermined phase difference, between read light respectively reflected from said land and pit regions, within a range of from about $0.25\pi$ to about $0.75\pi$;

(c) means for scanning said read light beam with respect to the digital data tracks of said optical disk;

(d) means for split detecting the read light beam reflected from the digital data tracks of said optical disk to produce an analog electrical signal; and (e) means for peak detecting said electrical signal to identify the location of the leading and trailing pit edges.

4. The invention defined in claim 3 wherein said means for peak-detecting includes differentiator circuit means for receiving said analog signal and zero-cross detector means for receiving and processing the output of said differentiator circuit means to produce signal pulses indicative of leading and trailing pit edges.

5. The invention defined in claim 4 further including absolute value circuit means and for receiving and processing said analog signal, threshold detector means for receiving the output of said absolute value circuit means and AND gate means with inputs coupled to receive signals from said absolute value circuit means and said zero-cross detector means.

6. A high-information density optical disk adapted for readout with read light of a predetermined wavelength comprising a thermally-deformable, read-light-transparent record layer of predetermined nominal thickness and a contiguous thermally conductive, reflective layer, said record layer having digital data tracks comprising land regions of said nominal thickness interleaved between pit regions of: (1) different in-track lengths forming a pit length range constituting a disk fractional bandwidth greater than 4.0, (2) varying cross-track width and (3) depth yielding a generally uniform, predetermined phase difference, between read light respectively reflected from said land and pit regions, within a range of from about $0.25\pi$ to about $0.75\pi$.

* * * * *